(12) United States Patent
Tishenko (10) Patent No.: US 11,648,868 B1
(45) Date of Patent: May 16, 2023

(54) VESSEL GUIDANCE SYSTEM

(71) Applicant: Peter Tishenko, Prosper, TX (US)

(72) Inventor: Peter Tishenko, Prosper, TX (US)

( * ) Notice: Subject to any disclaimer, the term of this patent is extended or adjusted under 35 U.S.C. 154(b) by 1081 days.

(21) Appl. No.: 16/249,436

(22) Filed: Jan. 16, 2019

Related U.S. Application Data (60) Provisional application No. 62/617,636, filed on Jan. 16, 2018.

(51) Int. Cl.
B60P 3/10 (2006.01)

(52) U.S. Cl.
CPC ........... B60P 3/1066 (2013.01); B60P 3/1075 (2013.01); B60P 3/1091 (2013.01)

(58) Field of Classification Search
CPC ..... B60P 3/1033; B60P 3/1075; B60P 3/1091; B60P 3/1066

See application file for complete search history.

(56) References Cited

U.S. PATENT DOCUMENTS

| | | | | |
|---|---|---|---|---|
| 3,744,072 A | * | 7/1973 | Pannell | B60P 3/1033 114/344 |
| 4,801,153 A | * | 1/1989 | Wilson | B60P 3/1033 280/414.1 |
| 5,013,206 A | * | 5/1991 | Ernst | B60P 3/1033 114/344 |
| 5,228,713 A | * | 7/1993 | Kovach | B60P 3/1033 280/414.1 |
| 6,695,336 B1 | * | 2/2004 | Grabenstetter | B60P 3/1033 280/414.2 |
| 6,719,317 B1 | * | 4/2004 | Grovender | B60P 3/1033 280/414.1 |
| 7,753,389 B1 | * | 7/2010 | Koball | B60P 3/1033 280/414.1 |
| 9,440,576 B1 | * | 9/2016 | Wierzba | B60P 3/08 |
| 10,232,760 B2 | * | 3/2019 | Leasure | B60P 3/1075 |
| 2003/0137124 A1 | * | 7/2003 | Marchese | B60P 3/1075 280/414.1 |
| 2003/0164604 A1 | * | 9/2003 | Fogg | B60P 3/1066 280/414.1 |
| 2009/0297310 A1 | * | 12/2009 | Heck | B60P 3/1066 414/498 |

(Continued)

FOREIGN PATENT DOCUMENTS

| | | | | |
|---|---|---|---|---|
| CA | 2182255 C | * | 8/2007 | ............ B60P 3/1066 |
| CA | 2585212 A1 | * | 10/2007 | ............ B60P 3/1033 |
| CN | 112537244 A | * | 3/2021 | |

(Continued)

*Primary Examiner* — Kaitlin S Joerger
(74) *Attorney, Agent, or Firm* — Kenneth L. Tolar (57) ABSTRACT

A vessel guidance system is used with a boat trailer typically having a frame formed of a pair of side rails with numerous transverse rails ding therebetween. The guidance system includes a pair of elongated, buoyant supports, each hingedly attached to the front end of one the trailer side rails. Each support configured to receive a pontoon or a discrete portion of a boat hull. Extending from the rear end of each support is a V-shaped guide for capturing the nose cone and the skeg on a pontoon or boat hull. Once the hull or pontoon is captured, the vessel is guided onto the supports as the vessel is further propelled onto the trailer. As the towing vehicle withdraws the trailer from the water, the supports gradually lower the vessel onto the trailer frame.

19 Claims, 8 Drawing Sheets

(56) References Cited

U.S. PATENT DOCUMENTS

2016/0368578 A1\* 12/2016 Walke .................... H04N 5/247
2017/0341561 A1\* 11/2017 Hess ..................... B60P 3/1075

FOREIGN PATENT DOCUMENTS

| GB | 2123756 A | \* | 2/1984 | ............... B63C 3/12 |
| GB | 2290771 A | \* | 1/1996 | ............ B63C 13/00 |
| GB | 2419853 A | \* | 5/2006 | ............... B63C 3/00 |
| KR | 101855871 B1 | \* | 5/2018 | |
| WO | WO-0132467 A1 | \* | 5/2001 | ............ B60P 3/1091 |
| WO | WO-2010151863 A2 | \* | 12/2010 | ............. B60D 1/145 |

\* cited by examiner

VESSEL GUIDANCE SYSTEM

CROSS REFERENCE TO RELATED APPLICATIONS

This application is entitled to the benefit of provisional application No. 62/617,636 filed on Jan. 16, 2018, the specification of which is incorporated herein by reference.

BACKGROUND OF THE INVENTION

The present invention relates to a vessel guidance system that facilitates loading a boat onto a trailer.

DESCRIPTION OF THE PRIOR ART

Vessels, such as pontoon boats, jet skis and sailboats are typically stored on a trailer. When the boat is used, the trailer is towed to a boat-launch facility to unload the vessel into a body of water. To return the boat to its storage location, an operator drives the vessel back to the launch facility for reloading. However, properly aligning the boat on the trailer is cumbersome and difficult. First, the trailer is backed down the launch ramp until substantially submerged and the vessel is driven onto the trailer. The submerged trailer is not readily visible, particularly at night, which significantly hampers alignment.

Furthermore, as an operator drives a boat toward the submerged trailer, the approach angle, operator skill, wind and waves can further complicate the task. Often, multiple attempts are required to correctly position the vessel, subjecting the vessel and trailer to excessive wear-and-tear, delaying other operators from accessing the launch and generally causing severe frustration and aggravation.

Furthermore, once finally loaded on the trailer, the boat may be inadvertently winched in a misaligned position, creating an extremely hazardous situation on the roadway, One of the trailer tires may be overloaded, the trailer may sway or the boat might even dislodge thereby imperiling the passengers and other motorists. Furthermore, a swaying or wobbling trailer can cause the towing vehicle to lose control.

Accordingly, there is currently a need for a device that solves the aforementioned problems associated with loading a boat onto a trailer. The present invention addresses this need by providing a buoyant trailer attachment that guides a vessel onto an underlying, submerged trailer.

SUMMARY OF THE INVENTION

The present invention relates to a vessel guidance system for use with a boat trailer typically having a frame formed of a pair of side rails with numerous transverse rails extending therebetween. The guidance system according to the present invention includes a pair of elongated, buoyant supports, each hingedly attached to the front end of one the trailer side rails. Each support is configured to receive a pontoon or a discrete portion of a boat hull. Extending from the rear end of each support is a V-shaped guide for capturing the nose cone and the skeg on a pontoon or boat hull. Once the hull or pontoon is captured, the vessel is guided onto the supports as the vessel is further propelled onto the trailer. As the towing vehicle withdraws the trailer from the water, the floating supports will gradually lower the vessel onto the trailer frame.

It is therefore an object of the present invention to provide a vessel guidance system that facilitates loading a vessel onto a trailer.

It is therefore another object of the present invention to provide a vessel guidance system that floats when a boat trailer is submerged to be readily identifiable and visible as a boat operator approaches.

It is yet another object of the present invention to provide a vessel guidance system that conveniently guides a boat onto a submerged trailer.

Other objects, features, and advantages of the present invention will become readily apparent from the following detailed description of the preferred embodiment when considered with the attached drawings and the appended claims.

DESCRIPTION OF THE PREFERRED EMBODIMENT

Now referring to FIGS. 1-7B, an embodiment of the guidance system 100 designed primarily for pontoon boats 300 is depicted, though the present invention can be configured to receive and conform to the hull of virtually any watercraft, such as jet skis, fishing boats or any other craft that is towed by a trailer. A conventional pontoon boat 300 typically includes a deck and an overlying canopy supported on a pair of pontoons 51.

The embodiment depicted in FIG. 1-7B is designed for the pontoon boat described above and is attached to a conventional boat trailer 200. The trailer includes a frame 202 formed of a pair of side rails 210 with a plurality of transverse rails 6 extending therebetween. The frame may include a winch 208 and a swinging tongue jack 206 and is mounted on one or more wheels 204 for towing the trailer behind a vehicle. The guidance system 100 includes a pair of elongated buoyant supports 102 each having a front end and a rear end. The front end of each support is hingedly attached to one of the trailer side rails, near the front end. Each support 102 is formed of a Y-shaped frame 106 having a pair of diverging plates 104 with one or more support legs 20 depending therefrom. Preferably, the support leg is received within a notched tube mounted on a sliding plate for adjusting the spacing between the supports to accommodate boats having varying pontoon spacings or hull configurations.

Attached to the upper surface of each plate is a plank 103 encapsulated with a soft, smooth layer 116 of non-abrasive protective material, such as carpeting or fabric, to minimize damage to the vessel hull and the planks. Attached to the support leg is one or more blocks 42 of closed-cell EVA foam or a similar buoyant equivalent that assures that the supports will float when placed in water. Preferably, the buoyancy of each block is such that the diverging plates will float slightly above the water surface to be readily visible and to easily engage a boat hull or pontoon.

Extending from the rear end of each support is a V-shaped guide 104 for capturing the nose cone and the skeg on a pontoon or boat hull as it approaches the trailer. Once the hull or pontoon is captured, the vessel will be guided onto the supports as it is further propelled along the trailer. The guides are horizontally and vertically pivotal to adjust for wind and wave directions. For example, if the wind is blowing from right to left, the left guide can be raised and the right guide can be lowered into the water. And, both guides can be unobtrusively folded onto the supports when the trailer is being towed.

The guidance system optionally may include stabilization bars that prevent the supports from separating or twisting as a vessel is being guided thereon. Each bar extends from a front end of the trailer frame to a rear end of the opposing support. The bars are hinged to allow the supports to freely raise and lower relative to the trailer when placed in and removed from the body of water. As a boat impacts the supports from an angle, the rods maintain the supports in a substantially parallel orientation and will not further separate, twist or contort. The rods may be formed 1" diameter steel tubing having 0.375" nuts welded within the rods. Each end of the rod has a ⅜-22 threaded bolt having an attached corrosion resistant ball-joint rod end. These rods are capable of resisting forces of up to 3,000 pounds each during use.

Although the present invention has been primarily described for use with a pontoon boat, the above description is merely exemplary to illustrate the general function of and need for the guidance system 100. The use of the guidance system 100 is not limited to a pontoon boat, but may also be configured to properly position standard hulled boats, personal watercraft, jet skis, or any other watercraft requiring a trailer.

The guidance system 100 also works effectively on hydro-style lifts, where the guidance system 100 is hinged near the front of a U-shaped dock opening 304, and the guides 104 and supports 102 float partially submerged in the dock well of the air lift mechanism. The leading edge of the guidance system 100 is attached to the front of the well in the dock, to the dock itself, or to the bank of the lake, river or ocean. The guides 104 and supports 102 float on the surface to restrain the boat between uses. The head/or front of the guidance system 100 could be secured to the lake bed keeping the guidance system 100 stored below the water level until needed. The guides 104 and supports 102 are released to float to the surface to hold the boat 300 in place, until the boat 300 storage is no longer required, whereupon it can be re-submerged and stored until the next use.

Figure 1:
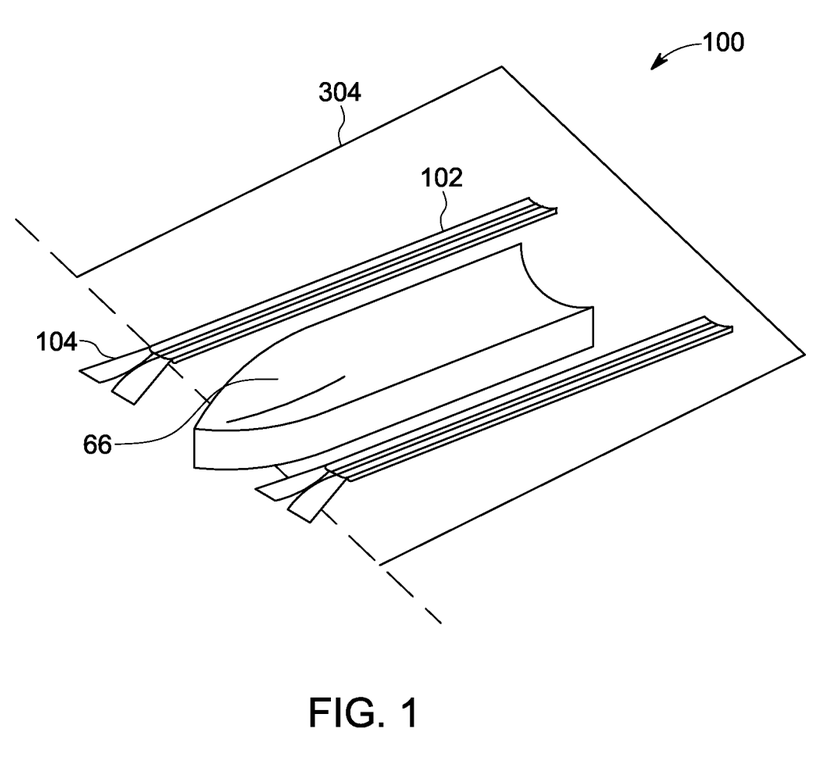
FIG. 1 is an isolated, perspective view of the supports according to the guidance system of the present invention.
Figure 2:
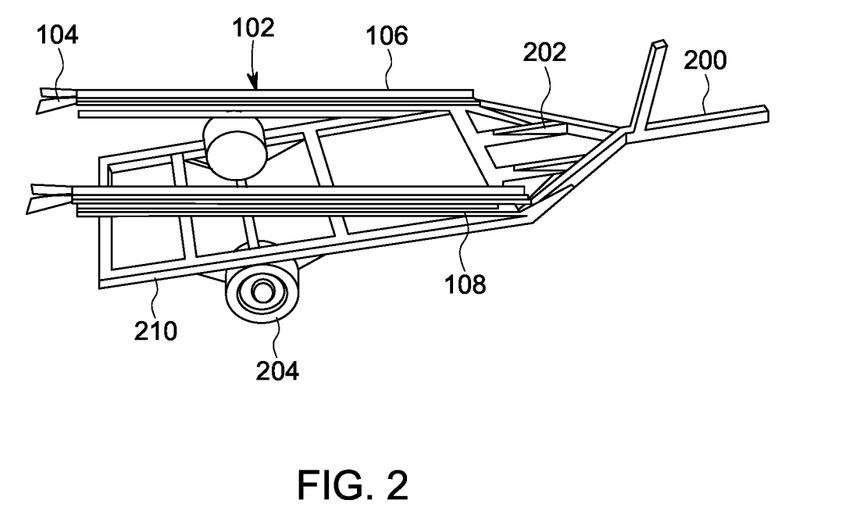
FIG. 2 is a perspective view of the guidance system mounted on a trailer.
Figure 3:
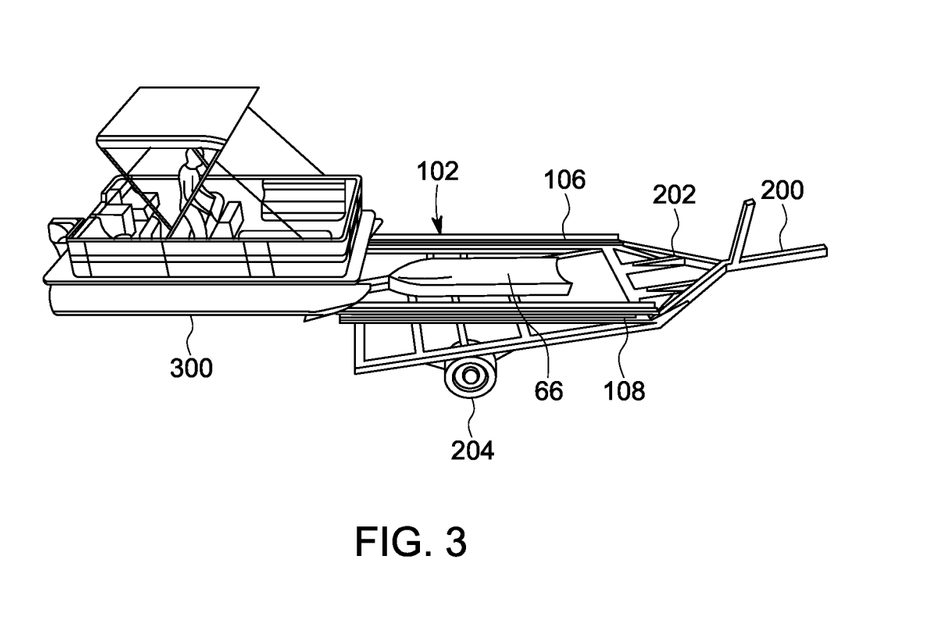
FIG. 3 depicts a boat operator directing a boat towards the guidance system according to the present invention.
Figure 4:
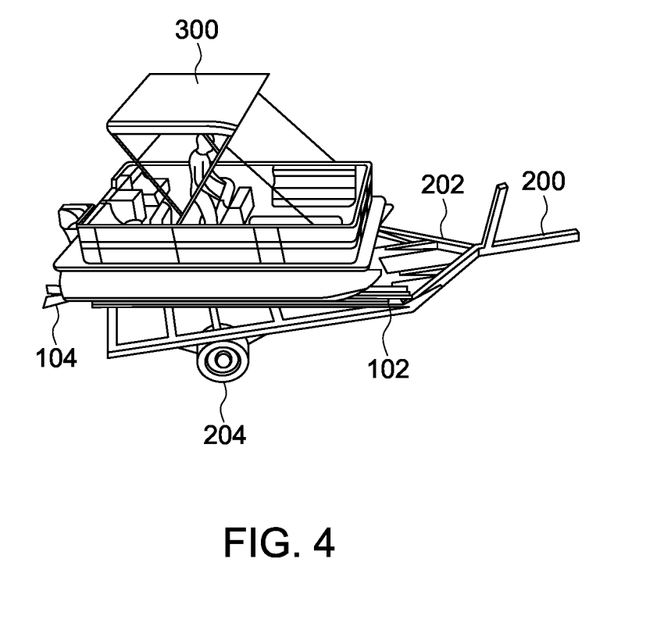
FIG. 4 depicts the boat of FIG. 2 resting on the guidance system according to the present invention.
Figure 5:
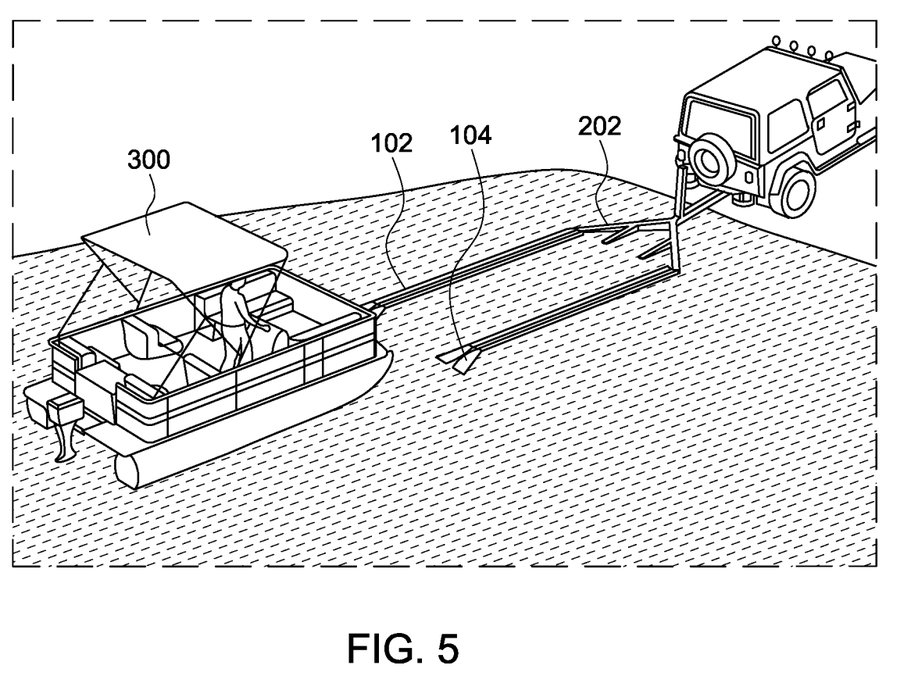
FIG. 5 depicts the trailer submerged with the guidance system floating and awaiting a vessel.
Figure 6A:
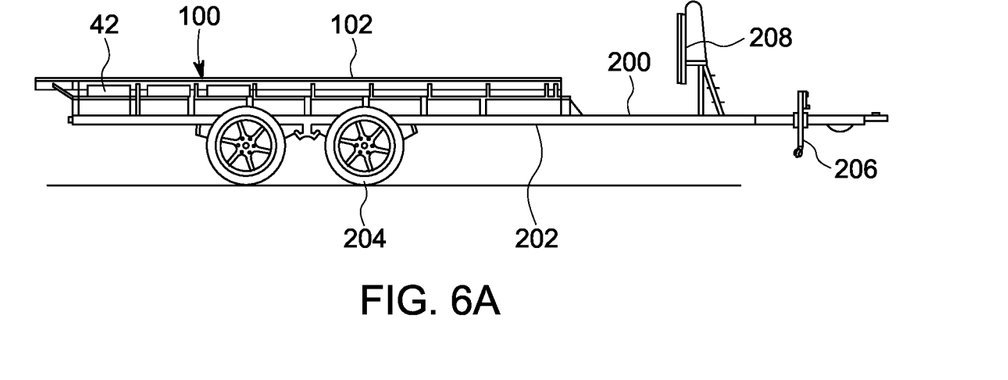
FIG. 6A is a side view of the guiding system and supporting trailer removed from a body of water.
Figure 6B:
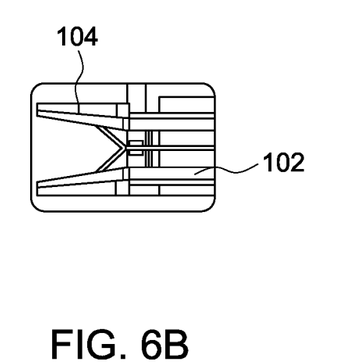
FIG. 6B is a top, sectional view of a support and guide.
Figure 6C:
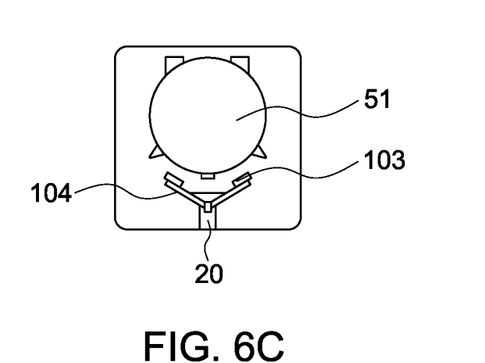
FIG. 6C is an end view depicting a boat pontoon approaching the support.
Figure 7A:
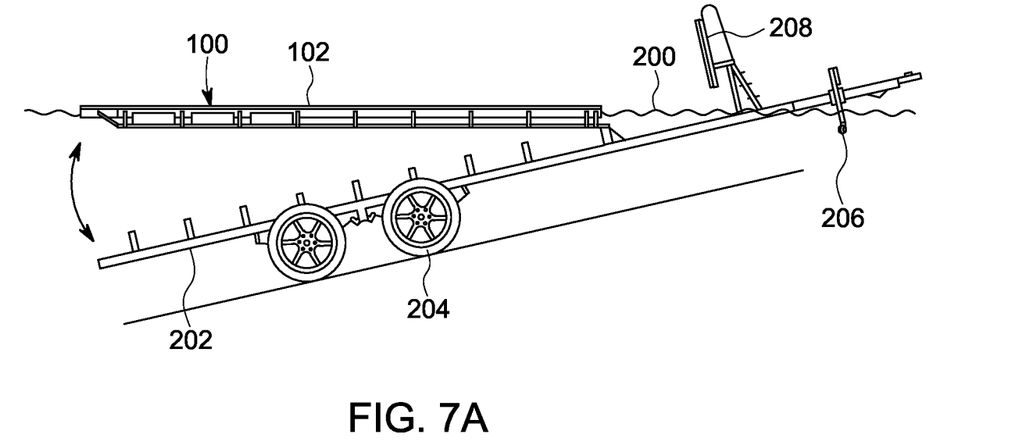
FIG. 7A is a side view of the guidance system with the supports floating above a submerged trailer.
Figure 7B:
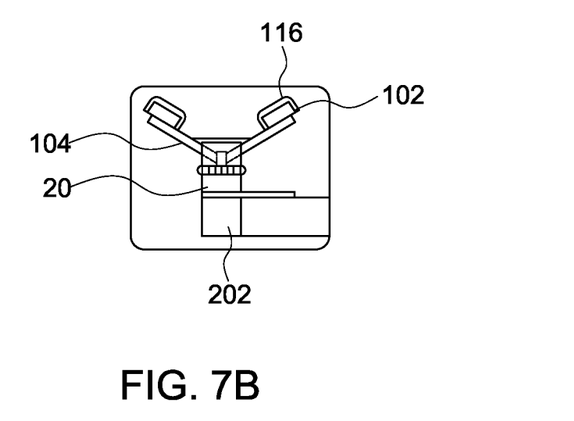
FIG. 7B is a sectional view of a support.
Figure 8:
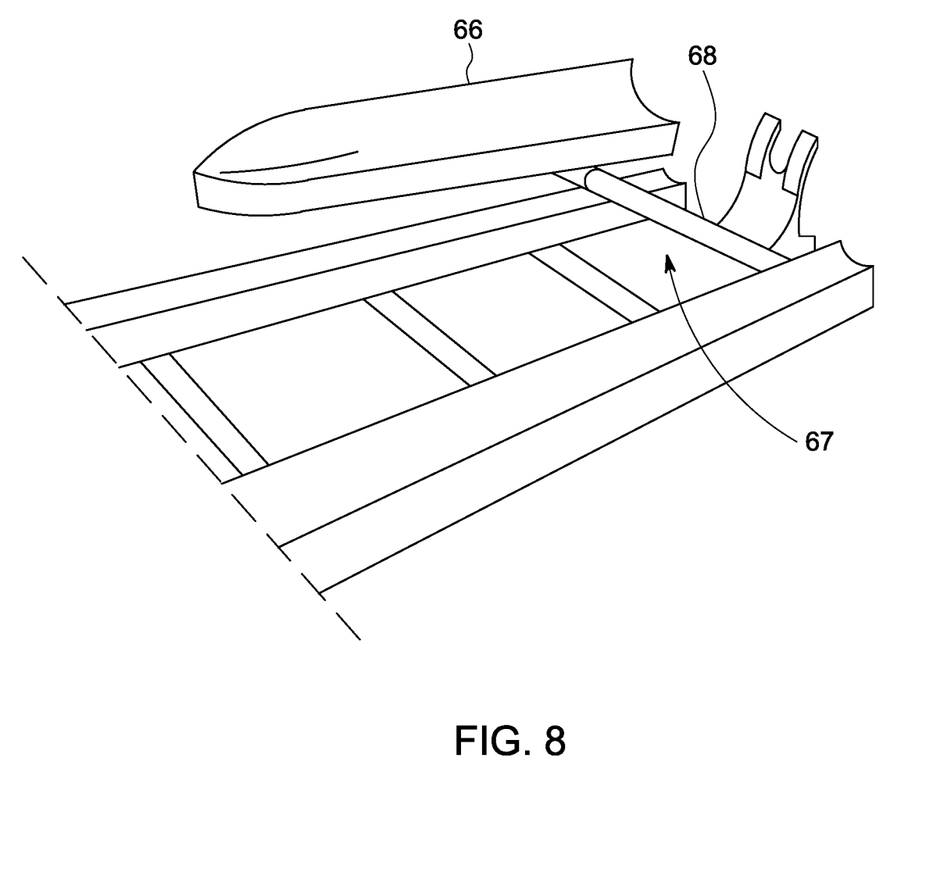
FIG. 8 depicts an alternate embodiment of the guidance system.

Furthermore, instead of the Y-shaped supports or other similar female-type supports for receiving a pontoon or hull, the vessel guidance system may include a single, buoyant, male-type guide. For example, a buoyant, arrow-shaped insert 66 can be used in lieu of in conjunction with supports 102 to guide the boat into position. The insert is dimensioned and configured to fit firmly between a pair of spaced pontoons on a vessel. The insert 66 is hingedly attached to a bracket 67 formed of two parallel side arms 68 pivotally attached to the rear end of the trailer. Accordingly, the insert can freely lift and pivot relative to the trailer so that as the trailer is submerged, the insert floats above the trailer to capture an approaching vessel.

To load a vessel onto a trailer, a user backs the trailer down a launch ramp until the trailer is submerged. The buoyant supports float on the water surface above the submerged trailer. A boat operator guides the vessel onto the supports by first using the guides for initial alignment. When the vessel is fully loaded and winched, the vehicle retracts the trailer at which time the supports and vessel are slowly lowered onto the underlying frame rails.

The above-described device is not limited to the exact details of construction and enumeration of parts provided herein. Furthermore, the size, shape and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a vessel trailer having a pair of side rails, said side rails each having a front end and a rear end, a vessel guidance system comprising:
    a buoyant support pivotally mounted on said trailer, wherein said support is an arrow-shaped insert positioned between said side rails, said insert mounted on a bracket pivotally attached to the rear end of said trailer that allows said insert to freely lift and pivot relative to said trailer, said insert dimensioned and configured to fit firmly between a pair of spaced pontoons on a vessel to guide said vessel onto said trailer.

2. The combination according to claim 1 further comprising a first elongated buoyant support having a front end and a rear end, the front end of said second elongated buoyant support hingedly attached to one of the trailer side rails, proximal the front end thereof, whereby when a trailer is placed in a body of water, said first elongated buoyant support floats on the body of water to guide said vessel onto said side rails.

3. The combination according to claim 2 further comprising a second elongated buoyant support having a front end and a rear end, the front end of said second elongated buoyant support hingedly attached to another of said side rails, proximal the front end thereof, whereby when the trailer is placed in a body of water, said first elongated buoyant support and said second elongated buoyant support float on the body of water to guide said vessel onto said side rails.

4. The combination according to claim 3 wherein each of said first elongated buoyant support and said second elongated buoyant is formed of a Y-shaped frame having a pair of diverging plates with a support leg depending therefrom, said diverging plates configured to capture a boat pontoon.

5. The vessel guidance system according to claim 4 further comprising a plank attached to an upper surface of each of said plates.

6. The vessel guidance system according to claim 5 wherein said plank is encapsulated with a soft, smooth layer of non-abrasive protective material to minimize damage to the hull portion and the planks.

7. The vessel guidance system according to claim 4 further comprising at least one buoyant block attached to said support leg to assure that each of said first elongated buoyant support and said second elongated buoyant float when placed in water.

8. The vessel guidance system according to claim 4 further comprising a V-shaped guide extending from the rear end of each of said first elongated buoyant support and said second elongated buoyant for capturing a nose cone and a skeg of a vessel approaching the trailer.

9. The vessel guidance system according to claim 8 wherein said guide is horizontally and vertically pivotal to adjust for wind and wave directions.

10. The vessel guidance system according to claim 2 further comprising a V-shaped guide extending from the rear end of said first elongated buoyant support for capturing a nose cone and a skeg of a vessel approaching the trailer.

11. The vessel guidance system according to claim 10 wherein said guide is horizontally and vertically pivotal to adjust for wind and wave directions.

12. In combination with a vessel trailer having a pair of side rails, said side rails each having a front end and a rear end, a vessel guidance system comprising:
a first buoyant support pivotally mounted on said trailer, said first buoyant support having a front end and a rear end, the front end of said first elongated buoyant support hingedly attached to one of the trailer side rails, proximal the front end thereof, said first elongated buoyant support configured to mate with a hull portion of a discrete vessel whereby when the trailer is placed in a body of water, said first elongated buoyant support floats on the body of water to guide said vessel onto said trailer;
a V-shaped guide extending from the rear end of said first elongated buoyant support for capturing a nose cone and a skeg of a vessel approaching the trailer.

13. The combination according to claim 12 further comprising a second elongated buoyant support having a front end and a rear end, the front end of said second elongated buoyant support hingedly attached to another of said side rails, proximal the front end thereof, whereby when the trailer is placed in a body of water, said second elongated buoyant support and said second support float on the body of water to guide said vessel onto said side rails.

14. The combination according to claim 13 wherein said first elongated buoyant support and said second elongated buoyant support are each formed of a Y-shaped frame having a pair of diverging plates with a support leg depending therefrom, said diverging plates configured to capture a boat pontoon.

15. The vessel guidance system according to claim 14 further comprising a plank attached to an upper surface of each of said plates.

16. The vessel guidance system according to claim 15 wherein said plank is encapsulated with a soft, smooth layer of non-abrasive protective material to minimize damage to the hull portion and the planks.

17. The vessel guidance system according to claim 14 further comprising at least one buoyant block attached to said support leg to assure that said first elongated buoyant support and said second elongated buoyant support float when placed in water.

18. The vessel guidance system according to claim 13 further comprising a V-shaped guide extending from the rear end of each of said first elongated buoyant support and said second elongated buoyant support for capturing a nose cone and a skeg of a vessel approaching the trailer.

19. The vessel guidance system according to claim 18 wherein said guide is horizontally and vertically pivotal to adjust for wind and wave directions.

\* \* \* \* \*